United States Patent Office 3,121,628
Patented Feb. 18, 1964

3,121,628
MANUFACTURE OF GLASS FOR ELECTRON TUBE ENVELOPES
Harry F. Loehrke, Toledo, Ohio, assignor to Owens-Illinois Glass Company, a corporation of Ohio
No Drawing. Filed Jan. 8, 1959, Ser. No. 785,568
2 Claims. (Cl. 65—18)

This invention relates to the manufacture of glass and particularly to the manufacture of glass for forming envelopes of electron tubes intended for use at high ambient temperatures.

A limiting factor in the use of glass for the envelopes of electron tubes which are subjected to high ambient temperatures is the presence of gas or water vapor in solution in the glass. It has heretofore been suggested that the entrained gas and water vapor may be reduced by taking particular precautions in melting the batch materials which are used to make the glass. However, such procedures are costly, difficult and not easily adaptable to large scale manufacture.

It is an object of this invention to provide a glass for envelopes of electron tubes which has reduced gas and moisture in solution therein.

It is therefore an object of this invention to provide a novel method of making such glass by treatment of the batch materials so that they may be melted in a conventional electric furnace without special precautions.

It is a further object of the invention to provide a novel form of batch materials for melting into glass which is to be used in forming electron tubes.

Basically, the invention comprises compressing the granular batch materials, which are normally melted to make the glass, into bricks, thereafter subjecting the bricks to a high vacuum in a closed chamber to remove the entrained gas and water vapor and heating the bricks while they are subjected to vacuum in said chamber in order to glaze the exterior surface of the bricks. The bricks may then be handled without special precautions. When it is desired to provide molten glass for forming the envelopes, the bricks are introduced into a conventional electrically heated tank and melted.

In order to facilitate the formation of the bricks from the glass batch materials, the glass batch materials are mixed with a suitable plastic binder which decomposes at a temperature substantially less than the melting point of the glass. The amount of plastic binder used may vary. Such plastic binders are well-known in the art. For example, satisfactory plastics which may be used are nitrocellulose in amyl acetate or acrylic resin (Du Pont RK-935).

The heat may be provided to the bricks either after the bricks are subjected to maximum vacuum or during the application of the vacuum. In the latter case, the temperature of the surface of the bricks must not be raised to the melting point until the brick is subjected to the maximum vacuum in order that the maximum amount of gas and moisture is removed from the bricks.

The invention is applicable but not limited to glass compositions which are conventionally used in the manufacture of electron tubes such as flint glass compositions, alkali free glass compositions, and solder glass compositions.

The temperature to which the bricks are heated to glaze the exterior surfaces while under vacuum is approximately the melting temperature of the glass being used. For example, the melting temperature of flint glass is approximately 1500° F., of alkali free glass is approximately 1900° F., and of solder glass is approximately 750° F.

Satisfactory flint compositions which may be used to form the bricks may have the following composition:

| | Percent |
|---|---|
| $SiO_2$ | 60–75 |
| $Al_2O_3$ | 0.3–10 |
| $CaO+MgO$ | 6–15 |
| $Na_2O$ | 12–18 |
| $K_2O$ | 0–5 |
| $BaO$ | 0–5 |
| Selenium | 0.00025–0.00030 |

A satisfactory alkali free composition which may be used to form the bricks may have the following composition:

| | Percent |
|---|---|
| $SiO_2$ | 63.7 |
| $Al_2O_3$ | 21.7 |
| $CaO+MgO$ | 7.3 |
| $BaO$ | 7.3 |

A satisfactory solder glass which may be used to form the bricks may have the following composition:

| | Percent |
|---|---|
| $SiO_2$ | 2.00 |
| $B_2O_3$ | 8.45 |
| $BaO$ | 2.00 |
| $ZnO$ | 12.83 |
| $PbO$ | 74.77 |

When bricks made in accordance with the invention are subsequently melted in an electrically heated tank, a glass is formed which can be used to form envelopes for electron tubes which are operated at high ambient temperatures. The resultant glass envelopes have a minimum of entrained gas and moisture therein. No special handling of the bricks is required and no particular or special operating precedures need be used in melting the bricks or heating the molten glass in the electrically heated tank.

I claim:
1. The method of making glass articles which are subjected to high ambient temperatures such as electron tube envelopes which comprises compressing a mixture of glass batch materials into bricks, subjecting the bricks to a high vacuum and simultaneously heating the bricks while they are subjected to said high vacuum to remove substantially all the entrained gas and moisture therefrom, additionally heating the bricks while continuing the application of said high vacuum at a temperature and for a time sufficient to glaze the entire exterior surface of the bricks and insufficient to fuse the batch materials within the bricks, and thereafter introducing said bricks into an electrically heated tank to melt the bricks and provide a molten glass for subsequent formation into glass articles.

2. The method of making glass articles which are subjected to high ambient temperatures and are substantially free of gas and moisture in solution in the solid glass which comprises compressing a mixture of glass batch materials into bricks, subjecting the bricks to a high vacuum, subjecting the bricks to heat while they are subjected to said high vacuum to remove substantially all the entrained gas and moisture therefrom, and additionally heating the bricks while continuing the application of said high vacuum at a temperature and for a time sufficient to glaze the entire exterior surface of the bricks and insufficient to fuse the batch materials within the bricks.

References Cited in the file of this patent

UNITED STATES PATENTS

| | | | |
|---|---|---|---|
| 805,139 | Hitchcock | Nov. 21, | 1905 |
| 1,598,308 | Pike | Aug. 31, | 1926 |
| 2,114,545 | Slayter | Apr. 19, | 1938 |
| 2,254,945 | Hunt et al. | Sept. 2, | 1941 |
| 2,412,925 | Stupakoff | Dec. 17, | 1946 |
| 2,453,864 | Schlehr | Nov. 16, | 1948 |
| 2,578,110 | Tooley | Dec. 11, | 1951 |
| 2,781,411 | Greffchen et al. | Feb. 12, | 1957 |
| 2,930,098 | Emeis | Mar. 29, | 1960 |